United States Patent Office 2,846,369
Patented Aug. 5, 1958

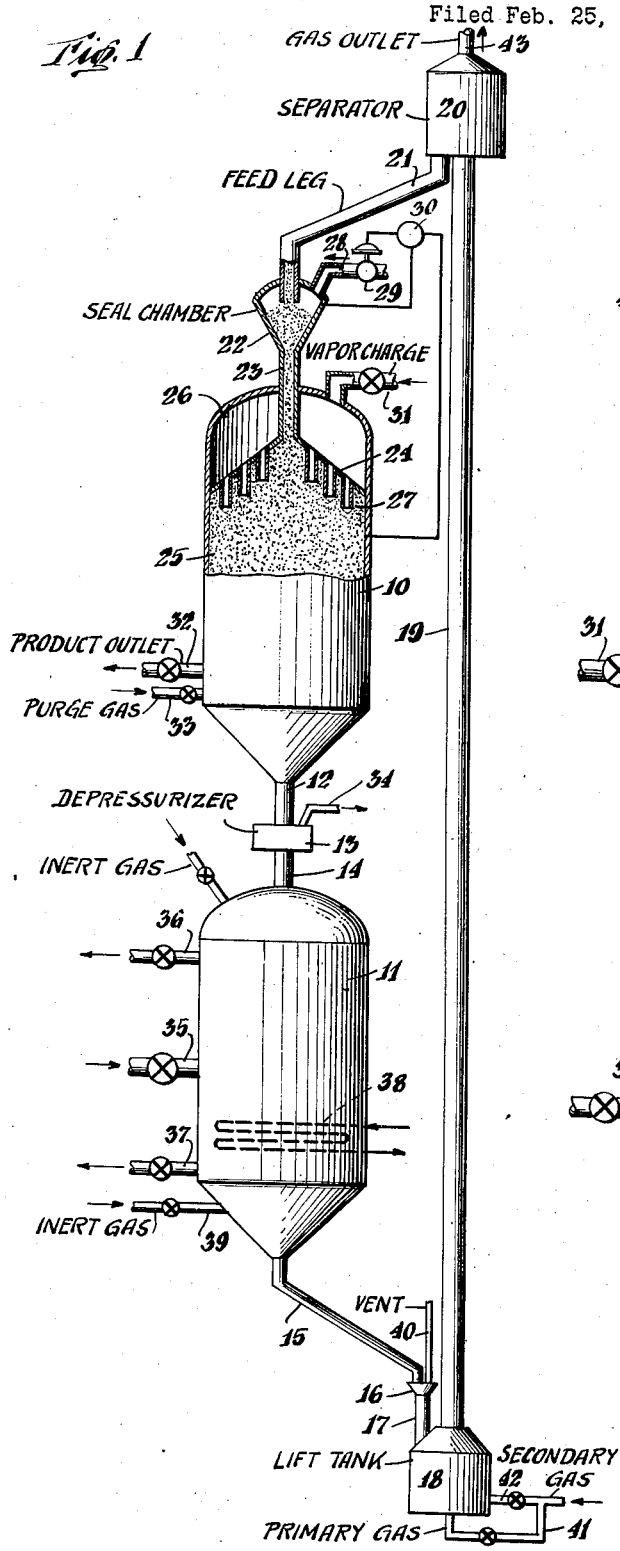
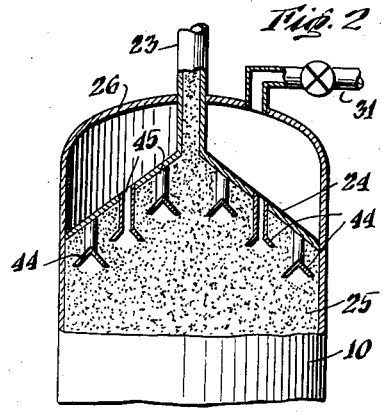
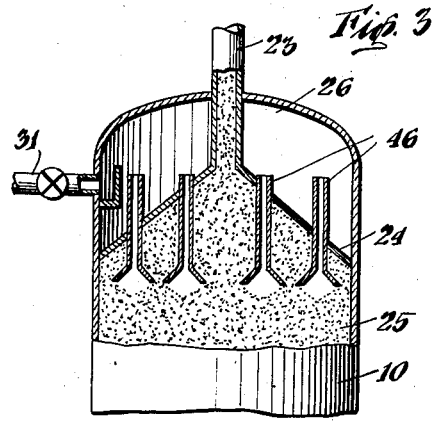
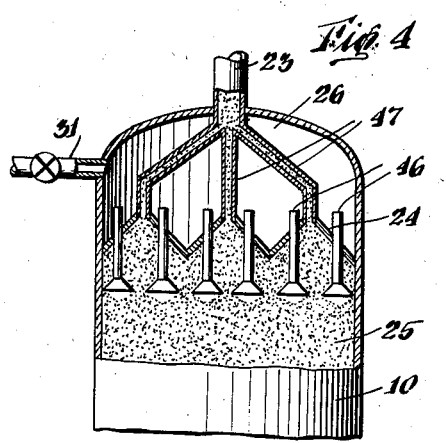
Aug. 5, 1958 — R. R. HALIK — 2,846,369
CONVERSION METHOD AND APPARATUS
Filed Feb. 25, 1953
INVENTOR.
Raymond R. Halik
BY
Andrew L. Gabrianlt
AGENT

2,846,369

CONVERSION METHOD AND APPARATUS

Raymond R. Halik, Pitman, N. J., assignor to Socony Mobil Oil Company, Inc., a corporation of New York Application February 25, 1953, Serial No. 338,773

10 Claims. (Cl. 196—52)

This invention is concerned with a method and apparatus for the conversion of gaseous reactants in the presence of a moving mass of granular contact material which may or may not exhibit catalytic properties with respect to the conversion reaction. It is particularly concerned with a method and apparatus for supplying reactants and contact material to the moving mass which avoids any substantial temperature gradient across the contact material mass at substantially any given level.

Typical of processes to which this invention may be applied is the catalytic conversion of high boiling vaporized hydrocarbons to lower boiling hydrocarbons by passing the vaporized charge downwardly through a downwardly gravitating, substantially compact column of granular adsorbent catalytic material at temperatures of the order of 850° F. and upwards. Other exemplary processes are the thermal cracking, coking or vis-breaking of a vaporized hydrocarbon charge by contact with a heated inert contact material and the catalytic reforming, desulfurization, isomerization, and the like, of a vaporized hydrocarbon with a granular catalyst.

Suitable contact material which is catalytic in nature may partake of the nature of natural or treated clays, bauxite, activated alumina or synthetic associations of silica, alumina, or silica and alumina, to which other substances, such as certain metallic oxides, may be added in small amounts for specific purposes. Contact material which is inert in character may partake of the form of refractory materials, such as zirkite, corhart or mullite, or it may partake of the form of stones or metallic particles or balls. In any case, it is desirable to maintain the contact material particles within the size range about 1 inch to 30 mesh, and preferably about 3 to 14 mesh by Tyler Standard Screen Analysis. The term "granular" is used in describing and claiming this invention to include particles of this size range whether of regular shape, such as pellets, tablets or spheres, or irregular shape, such as obtained from grinding and screening operations.

In processes of the aforementioned types, it is usual to maintain a substantially compact bed of contact material within a confined conversion zone with a gas plenum space above the bed in open communication therewith to which the gaseous reactants are supplied. Used contact material is removed from the lower section of the bed to promote downward movement of the bed while fresh contact material is supplied to the upper surface of the bed at one or more points of restricted area. The gaseous reactant, at a temperature substantially different than the contact material supplied to the bed, passes into the upper end of the bed and downwardly therethrough to effect the desired conversion reaction. Such a system results in cross-flow of contact material and reactant at the upper end of the bed which in turn leads to a temperature gradient across the bed, resulting in uneven conversion of the gaseous reactant. This will be best understood by considering, as an example, a hydrocarbon conversion system operated in the above manner. In such a system it is usually necessary to introduce the vaporized hydrocarbon charge, which may be the total charge or only a portion thereof, to the conversion zone at temperatures substantially below the optimum conversion temperature. This is necessary because the optimum conversion temperature is ordinarily above the temperature at which the vaporized charge undergoes thermal decomposition, and in order to obtain the best quality product, such thermal decomposition must be avoided in the vapor charge preheater. Therefore, the heat required to raise the temperature of the vaporized charge from the level to which it can be heated in the preheater without thermal decomposition to the optimum conversion temperature will be supplied by the contact material charged to the conversion zone. In addition, the heat required by the conversion reaction, which is normally endothermic, must be supplied by this contact material. Therefore, contact material supplied to the conversion zone will necessarily be at a temperature substantially above the temperature of the vaporized charge supplied to the conversion zone. This temperature differential may be as much as several hundred degrees. Where the contact material is supplied to the upper surface of the bed as a single central stream of restricted area, as is frequently the case, the upper surface of the bed will assume the shape of a cone with apex at the bottom of the supply stream and sides sloping downwardly and outwardly at angles with the horizontal equal to the angle of repose of the contact material. The angle of repose is normally within the range about 25 to 45 degrees with the horizontal. For most commercially used contact materials it is about 30 degrees. The vaporized charge is supplied to the plenum space above the bed and in open communication therewith and enters the upper end of the bed. Some of the contact material from the supply stream passes directly into the bed in the area directly beneath the supply stream, but a major portion of the contact material passes outwardly across the upper end of the bed as a transversely flowing layer to supply the portions of the bed not lying directly beneath the supply stream. The upper side of this layer forms the upper surface of the bed and particles from the layer enter the main body of the bed wherein the flow of particles is substantially unidirectionally downward. The cooler vaporized charge entering the bed passes first through this transversely flowing layer and acts to cool the particles therein. No temperature equilibrium is reached since the transverse layer flows across the vapor stream. Any given particle in the layer will therefore be cooled an amount depending on its distance of travel in the layer before entering the main body of the bed. This results in a temperature gradient across the bed, a maximum temperature directly below the supply stream, and a minimum temperature at the outer edges of the bed. This variation in temperature may be as much as several hundred degrees. Substantially, the same effect occurs where contact material is supplied to several sidely spaced-apart restricted areas, except that there will be several points of maximum and minimum temperature. The temperature gradient results in varying degrees of conversion in various laterally spaced-apart regions of the column with probable over-conversion beneath the supply stream and under-conversion in regions beneath the outer edges of the conical pile. It might be thought that the temperature across the column would tend to become uniform shortly below its upper surface due to interchange of contact material across the column between high and low temperature regions. It has been found that the degree of such interchange is slight, so that there is still a marked temperature gradient across the column at its lower end. It would also seem that there should be interchange of vapors across the column between high and low temperature regions which would tend to minimize the uneven conversion in the two sections by subjecting any given unit of charge for a part of its passage through the column to high temperature contact material and for the remainder to lower temperature contact material. It has been found, however, that the expected interchange of vapors through the column does not occur to any great extent. It might further be expected that heat transfer between contact material particles across the bed would tend to equalize the temperature in the lower sections of the bed. The rate of heat transfer between contact material particles is so low, however, that this does not occur.

Where the process is one in which the gaseous reactants are at a higher temperature than the contact material, the situation is reversed. The low temperature point is beneath the contact material supply stream while the high temperature point is near the outer edge of the contact material bed. The undesirable results are obviously the same, however.

An additional reason for the uneven conversion and temperature gradient across the contact material bed in such processes is found in the varying sizes of the contact material particles. While the contact material is normally kept within certain size limits, there is a variation in size within these limits. Also, some finer material is normally formed by attrition during the cyclic process. When the contact material is supplied to the bed as a central stream, the large particles tend to roll over the column surface to the outer portions of the bed and concentrate there while the smaller particles concentrate near the center of the bed. This results in channeling of the gaseous reactant through the bed and, again, uneven reaction.

A major object of this invention is to provide a method and apparatus for the conversion of gaseous reactants which overcomes the above-described difficulties.

Another object of this invention is to provide a method and apparatus for the conversion of a substantially entirely vaporized hydrocarbon charge uniformly to gaseous products.

Another object of this invention is to provide a method and apparatus for the conversion of a substantially entirely vaporized hydrocarbon charge to lower boiling products in the presence of a downwardly gravitating column of granular contact material whereby the temperatures across the contact material column at any given level are substantially the same.

These and other objects of the invention will be apparent from the following discussion of the invention.

This invention discloses a method and apparatus for the conversion of gaseous reactants in the presence of a moving mass of granular contact material wherein the contact material is maintained in a conversion zone as a substantially compact, downwardly gravitating bed. A substantially compact feed stream of horizontal cross-sectional area, only a minor fraction of the horizontal cross-sectional area of the bed, is passed into the upper section of the conversion zone. This stream is gradually expanded outwardly therein until it approaches the horizontal cross-sectional area of the bed and contact material passes from the stream to the bed. The expanding portion of the stream is laterally confined by solid surfaces, so that the sides of the expanding stream make angles with the horizontal greater than the angle of repose of the contact material. A gas plenum space is provided above the solid surfaces and gaseous reactant, at a substantially different temperature than the contact material, is supplied thereto. The gaseous reactant is passed as a plurality of streams from the plenum space through the solid surfaces into the mass of contact material and then passed downwardly through the contact material bed to effect the desired conversion. Products of conversion are removed from the bed and contact material removed from the lower section of the bed. The term "gaseous" is used herein in describing and claiming this invention to apply to materials in the gaseous phase under their existing temperature and pressure, regardless of the phase of the reactant under normal temperature and pressure.

This invention will be best understood by referring to the attached drawings, of which Figure 1 is an elevational view, partially in section, of a hydrocarbon conversion system with this invention applied to the reaction vessel, Figure 2 is an elevational view, partially in section, of the application of a modified form of this invention to the upper section of a hydrocarbon conversion reactor, Figure 3 is an elevational view, partially in section, of the application of another form of this invention to the upper section of a reaction vessel, and Figure 4 is an elevational view, partially in section, of still another form of this invention applied to the upper section of a conversion vessel.

All of these figures are diagrammatic in form and like parts in all bear like numerals.

Turning to Figure 1, there is shown therein a reaction or conversion vessel 10 superimposed on a reconditioning vessel 11. Contact material withdrawal conduit 12 extends from the lower section of vessel 10 into a depressurizing vessel 13 and conduit 14 connects the depressurizer with the upper section of vessel 11. Conduit 15 extends from the lower end of vessel 11 into a vent chamber 16 and conduit 17 connects the vent chamber with a lift feed tank 18. Lift pipe 19 extends vertically upwardly from within lift tank 18 to an intermediate level in separator 20 positioned at a level above vessel 10. Conduit 21 extends from the lower section of the separator into seal chamber 22. Conduit 23 extends from the lower section of chamber 22 centrally and vertically into the upper section of vessel 10. Connected to the lower end of 23 is an upwardly tapered hood 24 which extends outwardly to the walls of vessel 10 so as to divide the vessel into a conversion chamber 25 therebelow and a gas plenum chamber 26 thereabove. Hood 24 has downwardly sloping or diverging sides at an angle greater than the normal angle of repose of the contact material, so that the hood and lower section of 23 may be considered together as an inverted funnel or funnel-shaped member with spout connected to the lower end of 23. A plurality of passageways 27 for hydrocarbon charge pass from plenum chamber 26 through hood 24 to a plurality of points substantially below the hood.

In operation, granular contact material, at a temperature suitable to supply a substantial portion of the heat required by the conversion reaction, gravitates from the lower section of separator 20 through passage 21 into seal zone 22. In zone 22 a pressure of inert gas is maintained slightly above the pressure in the upper section of conversion zone 25. This is accomplished by supplying an inert gas, such as steam or flue gas, to zone 22 through passage 28 at a rate controlled by diaphragm valve 29 in response to differential pressure controller 30. A downwardly gravitating, substantially compact bed or column or contact material is maintained within conversion zone 25 in housing 10. A substantially compact feed stream of contact material of horizontal cross-sectional area only a minor fraction of the horizontal cross-sectional area of the bed passes from seal zone 22 centrally and vertically into the upper end of vessel 10 through passage 23. This stream is gradually expanded laterally until its horizontal cross-sectional area approaches the horizontal cross-sectional area of the contact material bed and it is delivered to the bed. While expanding, the stream is laterally confined by the solid surfaces of hood 24 at angles with the horizontal greater than the angle of repose of the contact material, so that there is no free flow of contact material across a contact material surface therein and therefore no segregation of contact material according to particle size. The expanded stream forms the upper section of the contact material column in zone 25 so, in effect, the column therein has an upper surface confined in the shape of a funnel at angles greater than the angle of repose of the contact material. Contact material is supplied to a restricted area of the upper surface of the column and the remainder of the column is confined from the point of supply by the downwardly and outwardly sloping surfaces of 24 at an angle with the horizontal greater than the angle of repose of the contact material. A vaporized hydrocarbon charge, at a temperature substantially below the temperature at which contact material is supplied to the column in zone 25 through passage 23, is supplied to plenum space 26 above confining surfaces 25 through passage 31. A plurality of streams of vaporized charge pass from space 26 through a plurality of passages 27 through hood 24 to a plurality of points below the upper surface of the contact material column and below hood 24. Passages 27 extend to a level where there is no further transverse flow of contact material supplied from passage 23 and the contact material flow is substantially only downward. Thus, since plenum space 26 is maintained out communication with conversion zone 25 except through passages 27, any given contact material particles will not be continuously subjected to cool vaporized charge, as when particles roll over a contact material surface exposed to vapor charge, but each unit of contact material will come to temperature equilibrium with a unit of vapor charge at a temperature intermediate between the two and all of the contact material and vapor in the column will arrive at substantially the same temperature at any given level because of the equilibrium. The confining hood 24, by preventing segregation of the contact material, prevents channeling of the vapors through the column, so that the substantially constant temperature across the column will not be upset for this reason. Vaporized charge passes downwardly through the contact material column and is converted to gaseous products. These products are removed through passage 32. The spent contact material is purged free of adhering hydrocarbons by inert purge gas, such as steam or flue gas, admitted through passage 33. Contact material is then passed downwardly through passage 12 into depressurizer 13 where the gas pressure is substantially relieved through vent 34. Spent contact material then passes from 13 through passage 14 into the upper end of reconditioner 11. The particular reconditioner shown is a catalyst regenerator. The catalytic contact material, bearing a carbonaceous contaminant deposited thereon in the conversion zone, passes through zone 11 as a substantially compact column. A combustion supporting gas, such as air, is admitted centrally to said column through passage 35 and flows upwardly through the upper section of the column and downwardly through its lower section to burn off the contaminant deposit. Flue gas is removed through passages 36 and 37. The temperature of the contact material is maintained below the heat damaging level by means of cooling coils 38. Other regenerator construction than that shown may be used. For example, if the contact material is substantially inert in character, reconditioner 11 may take the form of a contact material heater. The reconditioned contact material is purged by inert purge gas admitted through passage 39 and gravitated through passage 15 to vent chamber 16 where inert gas is removed through vent 40. Contact material is then passed into lift tank 18 through passage 17. A suitable lift gas, such as air or flue gas, is admitted through conduits 41 and 42, and the contact material mixed therewith in tank 18 is transported thereby up lift pipe 19 to separator 20 where the lift gas is removed through passage 43 and contact material collects in the lower section of the separator to be returned to vessel 10.

A modification of this invention is illustrated in Figure 2. Shown therein is the upper section of a conversion vessel 10 with a feed conduit 23 of substantially less horizontal cross-sectional area than the horizontal cross-sectional area of the vessel and the contact material column therein, extending into the upper section of the vessel. Downwardly and outwardly diverging solid surfaces 24 extend from the lower end of 23 to the walls of vessel 10 to form a hood, above which is vapor plenum chamber 26 and below which is conversion chamber 25. A plurality of ring-shaped members 44 in the form of horizontal, open-bottomed, inverted troughs are positioned at a plurality of levels below hood 24. Members 44 are of successively larger diameters at successively lower levels and are spaced far enough apart so as not to interfere with contact material flow therebetween. A plurality of conduits 45 connect plenum chamber 26 with each of troughs 44.

In operation, contact material gravitates into vessel 10 and onto a restricted area on the upper surface of a downwardly gravitating, substantially compact column of contact material within conversion zone 25. The remainder of the upper surface of the column from the point of supply of contact material is confined at angles greater than the angle of repose of the contact material by the solid surfaces of hood 24. Vapor charge is supplied to plenum space 26 through passage 31 at a temperature substantially below the temperature at which contact material is supplied to conversion zone 25 through passage 23. The vapor charge passes from plenum space 26 into troughs 44 below the upper surface of the contact material column in zone 25 through passages 45 and then distributes itself throughout the troughs and passes into the contact material column. The process then proceeds as previously described. By using troughs 44 fewer of conduits 45 are needed. Thus, there will be fewer conduits 45 in Figure 2 than there are conduits 27 in Figure 1 to achieve uniform vapor distribution.

Figure 3 illustrates a further modification of this invention, in which vapor supply conduits 46 extend from a common level in plenum chamber 26 to a common level below the upper surface of the contact material column in conversion zone 25. Conduits 46 have expanded lower ends to aid in the distribution of vapor charge throughout the column. Since the vapor charge is supplied to the column at a single level in Figure 3, there will never be any substantial temperature gradient across the contact material bed in zone 25, while when the vapor is supplied at a plurality of levels as in Figures 1 and 2, there will be a temperature gradient in the extreme upper section of the column, since the vapor supplied at the lower level will not reach equilibrium with the contact material until a lower level in the column than the vapor introduced at higher levels. This does not have a disadvantageous effect, however, because the equilibrium is reached quite rapidly before the vapor passes through even a small fraction of the column length and the equilibrium temperatures arrived at will all be essentially the same because no particles are subjected to cooler vapor for long periods of time as when they pass over a contact material surface.

A further modification is shown in Figure 4, where the inlet contact material stream in conduit 23 is split into a plurality of streams flowing through branch passages 47. Connected to the lower end of each of these passages is a hood 24 with sides at angles with the horizontal greater than the angle of repose of the contact material. These hoods divide reactor 10 into a plenum space 26 above the hoods and a conversion zone therebelow which is filled with a compact reaction bed of contact material. Vaporized hydrocarbon charge is supplied to plenum space 25 and passes into the bed, as previously described, through passages 46.

This invention then provides a system in which segregation of catalyst, according to particle size, is prevented by confining the upper surface of the column at angles greater than the angle of repose with solid surfaces 24, so that channeling of vapor charge through the catalyst bed is prevented. In addition, vapor charge is supplied below the bed surface at a level where the transverse flow of contact material across the bed has been completed and the contact material particles are passing essentially only downwardly. By this means temperature gradients across the bed are minimized and uniform conversion of gaseous reactant achieved. Some transverse flow of contact material particles may occur directly beneath passages, like 27, to fill in the space created there, but this does not result in a substantial segregation of the contact material particles and the effect on the overall operation is negligible.

The effect of the angle of the side walls of hood 24 on the segregation of contact material is illustrated in the following table:

| Slope of Confining Wall | Degree of Segregation, Percent Range of Particle Diameter |
| --- | --- |
| Free Flow—No Wall | 46 |
| 35° | 32 |
| 40° | 19 |
| 45° | 13 |

These data are based on a segregation study on a spherical bead catalyst of 48 pounds per cubic foot gravity packed density made up of particles covering the range 4 to 20 mesh size by Tyler Standard Screen Analysis. Catalyst was supplied onto a bed having a diameter of eight feet in this experiment and samples were taken at intervals across the bed and subjected to screen analysis. The difference between the average particle diameter of the coarsest and finest samples taken from the bed was taken to be the extent of segregation. This number was divided by the average particle diameter of the mixed catalyst supplied to the bed to give the percentage value in the above table. It will be noted that while there is an improvement in segregation in confining the bed surface at angles greater than the angle of repose, an angle of at least 40 degrees is required to substantially eliminate segregation. Thus, for spherical particles the solid confining surfaces on the upper section of the contact material bed should form angles with the horizontal of at least 40 degrees. For particles of other shapes, the confining surfaces should be at angles with the horizontal of at least 45 degrees. Preferably, the confining surface should be at an angle within the range about 45 to 65 degrees in all applications.

While the conversion vessel in this invention has been shown as being circular in horizontal cross-sectional shape, it may take other shapes, such as rectangular, hexagonal, etc. Hood 24, in any case, should have the same horizontal cross-sectional shape as the vessel. The vaporized charge supplied to the conversion vessel plenum chamber should be substantially entirely vaporized. A liquid hydrocarbon charge may be supplied to the catalyst at a point below hood 24 or injected into feed leg 23, if desired. The points of vaporized charge introduction to the contact material column, for example, the lower ends of conduits 27 and 46, and channels 44, should generally be at levels below the surface of the contact material column where the contact material flow is substantially unidirectionally downward, that is, at a level where transverse flow across the column, due to expansion of the contact material supply stream, has been completed. Generally, the points of vapor supply should be a distance at least about 2 inches to 5 inches below the upper surface of the column and the solid confining surfaces, such as hood 24, thereon. Preferably, the point of vapor supply should be a distance within the range about 4 inches to 30 inches below the column surface.

The vapor supply pipes or passage should be spaced apart uniformly with respect to the horizontal cross-section of the contact material column. Generally, the center-to-center distance between the vapor supply pipes should be less than 20 inches center-to-center, and preferably less than 10 inches, and still more preferably less than 7 inches center-to-center. The total area occupied by the lower ends of the vapor supply passages should be greater than 2 percent, and preferably greater than 10 percent of the horizontal cross-section of the conversion chamber and the contact material column therein to prevent disruption of the column. There should be a distance of at least 1.5 and preferably 3 inches between adjacent vapor inlet passages, so that there will be no hold-up of contact material flow between the passages.

The more limited claims of this invention, particularly those containing the above numerical limits, are dominated by the broad claims of U. S. patent application, Serial No. 338,774, filed February 25, 1953.

While this invention has been illustrated in connection with hydrocarbon conversion reactors wherein the contact material supplies a major portion of the heat required by the reaction and therefore enters at a higher temperature than the vapor charge, it applies equally well where the gaseous reactant enters at a higher temperature than the contact material.

When used for hydrocarbon conversions wherein the contact material supplies at least a major portion of the heat required, the contact material should be heated, before entering the conversion zone, to a temperature sufficient to supply the required amount of heat without falling below the desired conversion temperature. When the contact material has a catalytic effect on the reaction, the temperature thereof on introduction should generally be within the range of about 900° F. to 1250° F. Where the contact material serves merely as a heat carrier for a thermal cracking or coking reaction, its charging temperature may range as high as 1700° F. The hydrocarbon charge should be substantially entirely vaporized and should be introduced at a temperature within the range of about 650° F. to 900° F. The ratio of contact material to vaporized charge introduced into the conversion zone should generally be within the range of about 1.5 to 20 parts of contact material per part of oil by weight.

In a typical application of this invention to a hydrocarbon conversion system, the hydrocarbon charge might consist of a vaporized petroleum gas oil while the contact material could be a synthetic silica-alumina catalyst. Catalyst, at the rate of 315 tons per day, might be supplied at a temperature of about 1030° F., while the vapor charge, at the rate of 18,000 bbl. per day, could be supplied at 790° F. The vapor inlet pipes to the catalyst column might be spaced 6 inches apart center-to-center to effect the desired temperature equalization across the bed.

This invention should be understood to include all changes and modifications of the examples of the invention herein chosen for purposes of disclosure which do not constitute a departure from the spirit and scope of the invention.

I claim:

1. A method for the continuous conversion of gaseous reactants in the presence of a moving mass of granular contact material, which comprises: maintaining a downwardly gravitating, substantially compact bed of granular contact material within a confined conversion zone, passing at least one substantially compact feed stream of contact material of horizontal cross-sectional area only a minor fraction of the horizontal cross-sectional area of said bed into the upper section of said zone, gradually expanding said feed stream to an area approaching that of said bed and delivering contact material therefrom onto said bed, laterally confining said expanding stream by means of solid surfaces so that the sides of said expanding stream form angles with the horizontal greater than the angle of repose of said contact material whereby free flow of contact material across a contact material surface in said expanding stream is avoided, maintaining a gas plenum space for gaseous reactants above said solid confining surfaces, supplying gaseous reactants to said plenum space at a temperature substantially different from the temperature of the contact material in said contact material feed stream, passing a plurality of laterally confined streams of gaseous reactants from said plenum space through said solid surfaces to a plurality of points below said solid surfaces and the expanding stream, passing reactants from said streams through said bed to effect the desired conversion of the reactants, removing the products of conversion from said bed, at least a part of said product being removed at a level below the level of reactant supply and removing granular contact material from the lower section of said bed.

2. A continuous process for the conversion of vaporized hydrocarbon charge to gaseous products in the presence of a downwardly gravitating, substantially compact column of granular contact material, which comprises: maintaining said column within the lower section of a confined conversion zone, supplying a substantially compact stream of contact material of substantially less horizontal cross-section than said column and at temperature suitable to supply at least a major portion of the heat required by the conversion reaction to the upper surface of said column, whereby the contact material spreads outwardly from said stream over the surface of said column as a transversely flowing layer, confining the upper surface of said column and said transversely flowing layer by means of solid confining surfaces in the shape of an inverted funnel with apex at the point of supply of said stream to said upper surface, said confining surfaces making an angle with the horizontal greater than the angle of repose of said contact material, maintaining a plenum space for vaporized hydrocarbon charge above said confining surfaces, supplying vaporized hydrocarbon charge to said plenum space at a temperature substantially below the temperature at which contact material is supplied to said column, passing vaporized charge as a plurality of spaced-apart laterally confined streams from said plenum space through said confining surfaces to a plurality of points below said transversely flowing layer of contact material at the upper end of said column, discharging said streams of vaporized charge into said column and passing said charge through the column to uniformly effect the desired conversion to gaseous products, removing said products from the conversion zone, at least a part of said product being removed at a level below the level of reactant supply and removing granular contact material from the lower section of said column.

3. A continuous process for the conversion of a vaporized hydrocarbon charge to gaseous products in the presence of a downwardly gravitating, substantially compact column of granular contact material, which comprises: maintaining said column within a confined conversion zone, supplying a substantially compact stream of contact material of horizontal cross-sectional area substantially less than the horizontal cross-sectional area of said column to a restricted open area only a small fraction of the horizontal cross-section of said column in the center of the upper surface of said column, confining the remainder of the area of the upper surface of said column by means of downwardly and outwardly sloping solid surfaces at an angle greater than about 40 degrees, whereby free surface flow of contact material across the upper surface of said column is prevented, maintaining a vaporized hydrocarbon charge plenum space above the upper surface of said column and said confining surfaces, supplying vaporized hydrocarbon charge to said plenum space at a temperature below the temperature at which contact material is supplied to said column, passing vaporized charge from said plenum space through a plurality of confined passages extending through said solid surfaces and below the upper surface of said column, each of said passages extending below the upper surface of said column to a level therein where the flow of contact material is substantially entirely downward, whereby the temperature across said column at substantially any given level therein will be substantially constant, passing vaporized charge from said passages through said column to effect the desired conversion to gaseous products, removing said products from the lower section of said conversion zone, and removing contact material from the lower section of said column.

4. A continuous process for the conversion of vaporized hydrocarbon charge to gaseous products in the presence of a downwardly gravitating, substantially compact column of granular contact material, which comprises: maintaining said column within a confined conversion zone, supplying a substantially compact stream of contact material at a temperature suitable for the desired conversion onto a restricted area of the upper surface of said column which is only a small fraction of the horizontal cross-sectional area of said column, confining the remainder of the area of the upper surface of said column by means of downwardly and outwardly sloping solid confining surfaces at an angle greater than about 40 degrees, whereby free surface flow of contact material across the upper surface of said column is prevented, maintaining a vaporized hydrocarbon charge plenum space above said column and said solid confining surfaces, supplying vaporized hydrocarbon charge to said plenum space at a temperature substantially below the temperature at which contact material is supplied to said column, passing a plurality of streams of vaporized charge through a plurality of uniformly spaced-apart passages from said plenum space through said solid confining surfaces, each of said passages terminating a distance at least 2 to 5 inches below the upper surface of said column, whereby the temperature across said column at any level below said passages will be substantially constant, discharging vaporized charge from said passages and passing said charge through said column to effect the desired conversion to gaseous products, removing gaseous granular contact material from the lower section of said column.

5. An apparatus for the conversion of vaporized hydrocarbon charge in the presence of a downwardly gravitating, substantially compact column of granular contact material, which comprises in combination: an enclosed vertical vessel, a downwardly extending contact material supply conduit extending into and terminating in the upper section of said vessel, means for supplying contact material to the upper end of said conduit, an inverted funnel-shaped member with upper end attached to said conduit so as to receive contact material therefrom and extending outwardly and downwardly to the walls of said vessed in the upper section thereof, so as to define a plenum chamber above the funnel-shaped member and a conversion chamber therebelow, the sides of said funnel-shaped member being at angles with the horizontal greater than about 40 degrees, means for supplying vaporized hydrocarbon charge to said plenum chamber, members defining a plurality of passageways for vaporized charge extending from said plenum chamber through said funnel-shaped member in said conversion chamber to levels at least 2 to 5 inches below said funnel-shaped member, means for withdrawing at least a part of the products of conversion from said vessel at a level below said vaporized charge means, and means for withdrawing contact material from the lower section of said conversion chamber.

6. An apparatus for the conversion of vaporized hydrocarbon charge in the presence of a downwardly gravitating, substantially compact column of granular contact material, which comprises in combination: an enclosed vertical vessel, a downwardly extending contact material supply conduit extending into and terminating in the upper section of said vessel, means for supplying contact material to the upper end of said conduit, an inverted funnel-shaped member with upper end attached to the lower end of said conduit so as to receive contact material therefrom and extending outwardly and downwardly to the walls of said vessel in the upper section thereof, so as to define a plenum chamber above the funnel-shaped member and a conversion chamber therebelow, the sides of said funnel-shaped member being at angles with the horizontal greater than about 40 degrees, means for supplying vaporized hydrocarbon charge to said plenum chamber, a plurality of spaced-apart, open-bottomed, horizontally-extending, gas distributor channels at least 2 to 5 inches beneath said funnel-shaped member, a plurality of conduits for vaporized charge extending from said plenum chamber into said channels, at least one of said conduits extending into each of said channels, means for withdrawing products of conversion from the lower section of said conversion chamber and an outlet for contact material extending from the lower section of said conversion chamber.

7. An apparatus for the conversion of vaporized hydrocarbon charge to gaseous products in the presence of a downwardly gravitating, substantially compact column of granular contact material, which comprises in combination: an enclosed vertical vessel, a conduit extending substantially vertically and centrally into the upper section of said vessel and terminating in the upper section thereof, means for supplying contact material at a temperature suitable for the desired conversion to said conduit, an inverted funnel with spout connected to the lower end of said conduit and sides extending outwardly and downwardly at angles within the range 45 to 65 degrees to the walls of said vessel, so as to define a vaporized charge plenum chamber thereabove and a conversion chamber therebelow, means for supplying vaporized hydrocarbon charge at a temperature below the temperature at which contact material is supplied to said conduit to said plenum chamber, a plurality of conduits for vapor flow extending from said plenum chamber through said funnel to a plurality of levels all at least 2 to 5 inches therebelow in the upper section of said conversion chamber, means for removing gaseous products from the lower section of said conversion chamber and an outlet for contact material extending from the lower end of said conversion chamber.

8. A continuous process for the conversion of a vaporized hydrocarbon charge to gaseous products in the presence of a downwardly gravitating, substantially compact column of granular contact material, which comprises: maintaining said column within a confined conversion zone, supplying contact material to the upper surface of said column as a substantially compact stream of substantially less horizontal cross-section than said column, confining the upper surface of said column from the point of supply of contact material at an angle with the horizontal greater than the angle of repose of said contact material by means of downwardly and outwardly sloping solid confining surfaces, maintaining a vaporized charge plenum space above said column and said confining surfaces, supplying vaporized hydrocarbon charge to said plenum space at a temperature substantially below the temperature at which contact material is supplied to said column, passing vaporized charge from said plenum space into said column through a plurality of confined passages terminating at a common level within said column below the upper surface thereof where the flow of contact material is substantially unidirectionally downwardly and uniformly spaced apart with respect to the horizontal cross-sectional area of said column a distance less than 20 inches center-to-center, said passages occupying a total area at their lower ends of at least two percent of the cross-sectional area of the column and being spaced at least 1.5 inches apart edge-to-edge, passing the vaporized charge downwardly through the column to effect the desired conversion to gaseous products, withdrawing said products from the lower section of said column and withdrawing contact material from the lower section of said column.

9. A continuous process for the conversion of a vaporized hydrocarbon charge to gaseous products in the presence of a downwardly gravitating, substantially compact column of granular contact material, which comprises: maintaining said column within a confined conversion zone, supplying contact material to the upper surface of said column as a substantially compact stream of substantially less horizontal cross-section than said column, confining the upper surface of said column from the point of supply of contact material at an angle with the horizontal greater than the angle of repose of said contact material by means of downwardly and outwardly sloping solid confining surfaces, maintaining a vaporized charge plenum space above said column and said confining surfaces, supplying vaporized hydrocarbon charge to said plenum space at a temperature substantially below the temperature at which contact material is supplied to said column, passing vaporized charge from said plenum space into said column through a plurality of confined passages terminating at a common level within said column at least 2 to 5 inches below the upper surface thereof and uniformly spaced apart with respect to the horizontal cross-sectional area of said column a distance less than 7 inches center-to-center, said passages occupying a total area at their lower ends of at least ten percent of the cross-sectional area of the column and being spaced at least 3 inches apart edge-to-edge, passing the vaporized charge downwardly through the column to effect the desired conversion to gaseous products, withdrawing said products from the lower section of said column and withdrawing contact material from the lower section of said column.

10. An apparatus for the conversion of vaporized hydrocarbon charge to gaseous products in the presence of a downwardly gravitating, substantially compact column of granular contact material, which comprises in combination: an enclosed vertical vessel, a conduit extending substantially vertically and centrally into the upper section of said vessel and terminating in the upper section thereof, means for supplying contact material at a temperature suitable for the desired convertion to said conduit, an inverted funnel with spout connected to the lower end of said conduit and sides extending outwardly and downwardly at angles within the range 45 to 65 degrees to the walls of said vessel, so as to define a vaporized charge plenum chamber thereabove and a conversion chamber therebelow, means for supplying vaporized hydrocarbon charge at a temperature below the temperature at which contact material is supplied to said conduit to said plenum chamber, a plurality of conduits for vapor flow extending from said plenum chamber through said funnel to a common level within the range about 4 to 30 inches below said funnel in the upper section of said conversion chamber, said plurality of conduits being uniformly spaced apart with respect to the horizontal cross-sectional area of said chamber a distance less than 20 inches center-to-center while the total horizontal cross-sectional area of said conduits at their lower ends is at least two percent of the horizontal cross-sectional area of said chamber, means for removing products of conversion from the lower section of said chamber and means for removing contact material from the lower section of said chamber.

References Cited in the file of this patent

UNITED STATES PATENTS

| | | |
|---|---|---|
| 2,432,503 | Bergstrom et al. | Dec. 16, 1947 |
| 2,509,019 | Simpson et al. | May 23, 1950 |
| 2,565,811 | Hall | Aug. 28, 1951 |
| 2,593,495 | Shimp | Apr. 22, 1952 |
| 2,661,321 | Schutte | Dec. 1, 1953 |
| 2,701,788 | Schutte | Feb. 8, 1955 |
| 2,726,146 | Shirk | Dec. 6, 1955 |

UNITED STATES PATENT OFFICE
CERTIFICATE OF CORRECTION

Patent No. 2,846,369                                                               August 5, 1958

Raymond R. Halik

It is hereby certified that error appears in the printed specification of the above numbered patent requiring correction and that the said Letters Patent should read as corrected below.

Column 5, line 9, for "confining surfaces 25" read -- confining surfaces 24 --; column 10, line 39, after "gaseous" insert -- products from the lower section of said zone and removing --; line 52, for "vessed" read -- vessel --; column 12, line 43, for "convertion" read -- conversion --.

Signed and sealed this 25th day of November 1958.

(SEAL)
Attest:

KARL H. AXLINE
Attesting Officer

ROBERT C. WATSON
Commissioner of Patents